United States Patent
Timmerman et al.

(10) Patent No.: US 12,306,799 B2
(45) Date of Patent: May 20, 2025

(54) IGNORE OBJECTS FROM SYNCHRONIZING TO CONTENT MANAGEMENT SYSTEM

(71) Applicant: Dropbox, Inc., San Francisco, CA (US)

(72) Inventors: Parker Timmerman, Jersey City, NJ (US); Benjamin Blum, Seattle, WA (US); Tate Song, Austin, TX (US); Hongyi Shen, Mountain View, CA (US); Yannis Liapis, Austin, TX (US)

(73) Assignee: Dropbox, Inc., San Francisco, CA (US)

( * ) Notice: Subject to any disclaimer, the term of this patent is extended or adjusted under 35 U.S.C. 154(b) by 299 days.

(21) Appl. No.: 17/133,053

(22) Filed: Dec. 23, 2020

(65) Prior Publication Data
US 2022/0197867 A1    Jun. 23, 2022

(51) Int. Cl.
*G06F 16/178* (2019.01)
(52) U.S. Cl.
CPC ................... *G06F 16/178* (2019.01)
(58) Field of Classification Search
CPC .................................................. G06F 16/178
See application file for complete search history.

(56) References Cited

U.S. PATENT DOCUMENTS

| | | | |
|---|---|---|---|
| 5,765,173 A | 6/1998 | Cane et al. | |
| 6,324,544 B1 | 11/2001 | Alam et al. | |
| 6,546,404 B1 | 4/2003 | Davis et al. | |
| 8,280,851 B2 | 10/2012 | Kaczmarski et al. | |
| 9,015,120 B1 | 4/2015 | Dutch et al. | |
| 9,152,507 B1 | 10/2015 | Bushman | |
| 9,825,925 B2 | 11/2017 | Hore | |
| 9,952,935 B2 | 4/2018 | DeLuca et al. | |
| 9,984,006 B2 | 5/2018 | Amarendran et al. | |
| 10,353,871 B2 | 7/2019 | Vibhor et al. | |
| 10,616,327 B2 | 4/2020 | Nichols et al. | |
| 2002/0138501 A1* | 9/2002 | Dake | G06F 16/10 |
| 2004/0158604 A1* | 8/2004 | Hepworth | H04L 67/63 |
| | | | 709/200 |
| 2006/0117063 A1* | 6/2006 | Havewala | G06F 21/6218 |
| 2006/0218435 A1 | 9/2006 | Van Ingen et al. | |
| 2008/0263103 A1* | 10/2008 | McGregor | G06F 16/285 |
| 2009/0228531 A1* | 9/2009 | Baumann | G06F 16/1787 |
| 2013/0212067 A1* | 8/2013 | Piasecki | G06F 16/1787 |
| | | | 707/620 |
| 2013/0226876 A1* | 8/2013 | Gati | G06F 16/178 |
| | | | 707/652 |
| 2015/0052105 A1 | 2/2015 | Nguyen | |
| 2015/0100546 A1* | 4/2015 | Eberlein | G06F 16/1787 |
| | | | 707/610 |

(Continued)

*Primary Examiner* — Marc S Somers
(74) *Attorney, Agent, or Firm* — Polsinelli PC

(57) ABSTRACT

Techniques and systems are provided for utilizing an ignore file in a content management system. For example, a process can detect an ignore file stored in a synchronized directory of a client device. The process can access the ignore file and interpret rules stored therein that prohibit any objects matching the rule from being synchronized with a content management server. During indexing of a synchronized directory, the process can apply the rules from the ignore file and mark objects that match a rule in the ignore file by writing an attribute to the object that identifies it as an ignored object that is exempt from synchronization with the content management server.

20 Claims, 6 Drawing Sheets

(56) References Cited

U.S. PATENT DOCUMENTS

| | | | |
|---|---|---|---|
| 2016/0162370 A1* | 6/2016 | Mehta | G06F 16/162 |
| | | | 707/610 |
| 2016/0171239 A1 | 6/2016 | Li et al. | |
| 2017/0149885 A1* | 5/2017 | Kaplan | G06F 16/2379 |
| 2017/0180424 A1* | 6/2017 | Hardee | H04L 63/0263 |
| 2019/0007460 A1 | 1/2019 | Ruppin et al. | |
| 2019/0243724 A1 | 8/2019 | Mbhor et al. | |

* cited by examiner

500

IGNORE FILE

502 — # .dbxignore revised 12/1/2020

504 — # Ignore documents saved in private folder
**/My Documents/Private/

506 — # These files are secret, don't copy to cloud
*.key

508 — # Ignore PNG and GIF files in My Photos directory
**/My Photos/+(*.png|*.gif)

FIG. 5

IGNORE OBJECTS FROM SYNCHRONIZING TO CONTENT MANAGEMENT SYSTEM

TECHNICAL FIELD

The present technology pertains to identifying objects that should not be synchronized to a content management system, and more specifically to a rule to identify an object in a synchronized directory that should be excluded from synchronization to the content management system.

BACKGROUND

Content management systems allow users to synchronize data that is stored on multiple devices. For example, data that is stored on a user's device can be backed-up to a content management server. The data synchronization process occurs seamlessly, with any changes, additions, or deletions of data on a user's device automatically propagated to the content management server. However, in some instances, a user may not want to synchronize all of the data on the device with the server.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which:

FIG. 5 illustrates an example ignore file, in accordance with some aspects of the present technology.

DETAILED DESCRIPTION

Figure 1:
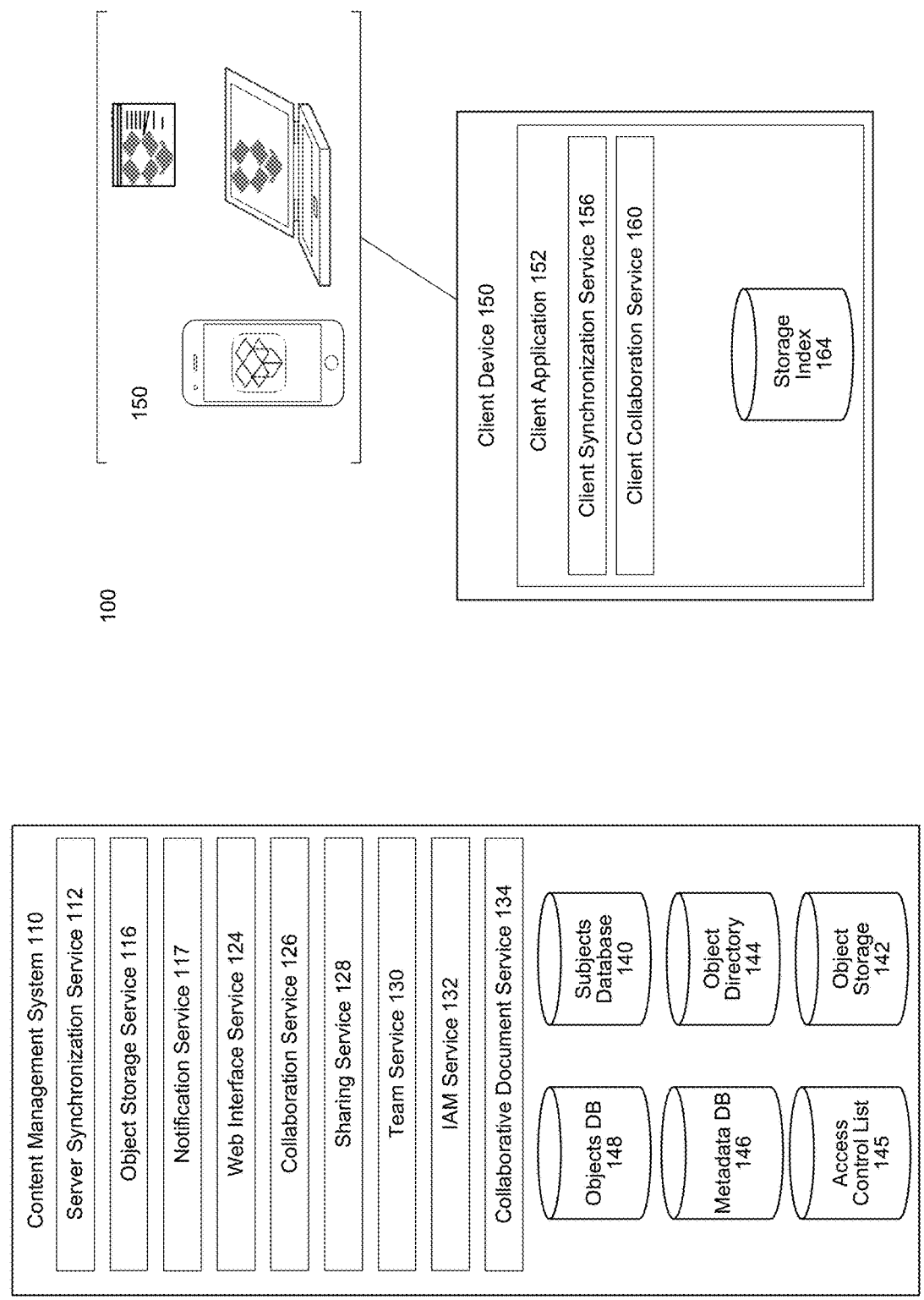
FIG. 1 illustrates an example of a content management system and client devices in accordance with some aspects of the present technology.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

Content management systems allow users to store and synchronize objects across multiple devices. Objects may include, but are not limited to, files, documents, messages, media files, folders, or any other form of electronic data. A primary advantage of content management systems is the synchronization of data that is stored on a client device with a content management server. Synchronization of data from a user device to server provides a back-up copy that mitigates against the loss of data if the user device is misplaced, stolen, or fails. A further advantage of such content management systems is that the data synchronization takes place automatically, without user intervention. That is, when a user saves a new object in a synchronized directory on the client device, the system will ensure that the object is copied to the content management server.

However, a drawback of content management systems is that they do not provide an efficient way for a user to designate objects that should not be synchronized to the server. Often a user must store an object outside of a synchronized directory when they do not wish for the object to be synchronized to the content management system. However, this is inconvenient when other related objects are all stored within the synchronized directory. A user should not have to choose between desired organization or having some files be synchronized to a content management system when this is not desired.

In an example, a user might be working on a project that includes a large object. The user might not desire to have the large object synchronized to a content management system because the large object might consume all of their available storage at the content management system. There needs to be a technology that allows the user to store all the objects related to the project in the same directory, where most of the objects in the directory are synchronized to a content management system, but some objects are excluded from synchronization.

The present technology addresses these shortcomings of content management systems by utilizing an ignore file. An ignore file can be used to establish rules for objects that are stored on a client device and are prohibited from synchronization to the content management server. As set forth more fully herein, the rules in the ignore file can be based on any attribute associated with an object. Furthermore, the system can apply the rules dynamically and persistently, such that any objects that are added to a synchronized directory of the client device are evaluated to determine if they are to be excluded prior to synchronization. In addition, objects that were previously stored on the content management server can be automatically removed by the system upon determining that they satisfy a rule in the ignore file.

The ignore file utilized in the present technology also provides advantages over other possible solutions to the problem of excluding some objects in a synchronized directory from synchronizing with a content management system. For example, a user can be presented with an option to exclude some objects from synchronization, but such a solution has a disadvantage that the object will immediately begin synchronizing as soon as it is placed in the directory. The object will only be excluded once it is in the directory and selected to be excluded. This behavior is not ideal because it is not efficient, and users might consider some objects too sensitive to synchronize at all, yet synchronization would have already begun. Also such a mechanism relies on a user to manually manage which objects synchronize or not. While this mechanism provides a solution to the fundamental problem, the present technology provides additional advantages of being more automatic and easier to administer.

Content Management System

In some embodiments the disclosed technology is deployed in the context of a content management system having object synchronization capabilities and collaboration features, among others. An example system configuration 100 is shown in FIG. 1, which depicts content management system 110 interacting with client device 150.

Accounts

Content management system 110 can store objects in association with accounts, as well as perform a variety of object management tasks, such as retrieve, modify, browse, and/or share the object(s). Furthermore, content management system 110 can enable an account to access object(s) from multiple client devices.

Content management system 110 supports a plurality of accounts. A subject (user, group, team, company, etc.) can create an account with content management system, and account details can be stored in subject database 140. Subject database 140 can identify a registered subject by a subject ID, and store profile information for registered subjects in association with the subject ID. In some cases, profile information for registered subjects includes a subject name and/or email address. Subject database 140 can include account management information, such as account type (e.g. various tiers of free or paid accounts), storage space allocated, storage space used, client devices 150 having a registered content management client application 152 resident thereon, security settings, personal configuration settings, etc. In some embodiments, some information associated with an account may not be directly stored, and rather this information can be derived. For example, storage space used might be explicitly stored, or it can be calculated when needed.

In some embodiments, subject database 140 need not store complete information associated with an account for a subject. Some portion of information associated with an account for a subject can also be stored in another database of content management system 110 such as metadata database 146, or in a database external to content management system 110.

Subject database 140 can store groups of accounts associated with a subject. Groups can have permissions based on group permissions statements and/or access control lists, and members of the groups can inherit the permissions. For example, a marketing group can have access to one set of objects while an engineering group can have access to another set of objects. An administrator group can modify groups, modify subject accounts, etc. Groups are also subjects identified by subject ID.

In some embodiments, subject database 140 can be broken into a plurality of tables, indexes and other data structures.

Object Storage

A feature of content management system 110 is the storage of objects, which can be stored in object storage 142. An object generally is any entity that can be recorded in a file system. Objects can be any object including digital data such as documents, collaboration objects, text files, audio files, image files, video files, webpages, executable files, binary files, object directories, folders, zip files, playlists, albums, symlinks, cloud docs, mounts, placeholder objects referencing other objects in content management system 110 or in other content management systems, etc.

In some embodiments, objects can be grouped into a collection, which can refer to a folder including a plurality of objects, or a plurality of objects that are related or grouped by a common attribute.

In some embodiments, object storage 142 is combined with other types of storage or databases to handle specific functions. Object storage 142 can store objects, while metadata regarding the objects can be stored in metadata database 146. Likewise, data regarding where an object is stored in object storage 142 can be stored in object directory 144. Additionally, data regarding changes, access, etc. can be stored in objects database 148. Objects database 148 can also include a subject account identifier that identifies the subject IDs that have access to the object.

In some embodiments, objects database 148 can be broken into a plurality of tables, indexes and other data structures.

Each of the various storages/databases such as object storage 142, object directory 144, objects database 148, and metadata database 146 can be comprised of more than one such storage or database and can be distributed over many devices and locations. Other configurations are also possible. For example, data from object storage 142, object directory 144, objects database 148, and/or metadata database 146 may be combined into one or more object storages or databases or further segmented into additional object storages or databases. Thus, content management system 110 may include more or less storages and/or databases than shown in FIG. 1.

In some embodiments, object storage 142 is associated with at least one object storage service 116, which includes software or other processor executable instructions for managing the storage of objects including, but not limited to, receiving objects for storage, preparing objects for storage, selecting a storage location for the object, retrieving objects from storage, etc. In some embodiments, object storage service 116 can divide an object into smaller chunks for storage at object storage 142. The location of each chunk making up an object can be recorded in object directory 144. Object directory 144 can include a content entry for each object stored in object storage 142. The content entry can be associated with an object ID, which uniquely identifies an object.

In some embodiments, each object and each chunk of an object can also be identified from a deterministic hash function. This method of identifying an object and chunks of objects can ensure that object duplicates are recognized as such since the deterministic hash function will output the same hash for every copy of the same object, but will output a different hash for a different object. Using this methodology, object storage service 116 can output a unique hash for each different version of an object.

Object storage service 116 can also designate or record a parent of an object or a content path for an object in objects database 148. The content path can include the name of the object and/or folder hierarchy associated with the object. For example, the content path can include a folder or path of folders in which the object is stored in a local file system on a client device. In some embodiments, object database might only store a direct ancestor or direct child of any object, which allows a full path for an object to be derived, and can be more efficient than storing the whole path for an object.

While objects are stored in object storage 142 in blocks and may not be stored under a tree like directory structure, such directory structure is a comfortable navigation structure for subjects viewing objects. Object storage service 116 can define or record a content path for an object wherein the "root" node of a directory structure can be any directory with specific access privileges assigned to it, as opposed to a directory that inherits access privileges from another directory.

In some embodiments a root directory can be mounted underneath another root directory to give the appearance of a single directory structure. This can occur when an account has access to a plurality of root directories. As addressed above, the directory structure is merely a comfortable navigation structure for subjects viewing objects, but does not correlate to storage locations of objects in object storage 142.

While the directory structure in which an account views objects does not correlate to storage locations of the objects at content management system 110, the directory structure can correlate to storage locations of the objects on client device 150 depending on the file system used by client device 150.

As addressed above, a content entry in object directory 144 can also include the location of each chunk making up an object. More specifically, the content entry can include content pointers that identify the location in object storage 142 of the chunks that make up the object.

Object storage service 116 can decrease the amount of storage space required by identifying duplicate objects or duplicate blocks that make up an object or versions of an object. Instead of storing multiple copies, object storage 142 can store a single copy of the object or block of the object, and object directory 144 can include a pointer or other mechanism to link the duplicates to the single copy.

Object storage service 116 can also store metadata describing objects, object types, folders, file path, and/or the relationship of objects to various accounts, collections, or groups in metadata database 146, in association with the object ID of the object.

Object storage service 116 can also store a log of data regarding changes, access, etc. in objects database 148. Objects database 148 can include the object ID of the object and can optionally include a description of the change or access action along with a time stamp or version number and any other relevant data. Objects database 148 can also include pointers to blocks affected by the change or object access. Object storage service 116 can also provide the ability to undo operations, by using an object version control mechanism that tracks changes to objects, different versions of objects (including diverging version trees), and a change history that can be acquired from objects database 148.

Object Synchronization

Another feature of content management system 110 is synchronization of objects with at least one client device 150. Client device(s) 150 can take different forms and have different capabilities. For example, client device 150 can be a computing device having a local file system accessible by multiple applications resident thereon. Client device 150 can be a computing device wherein objects are only accessible to a specific application or by permission given by the specific application, and the objects are typically stored either in an application specific space or in the cloud. Client device 150 can be any client device accessing content management system 110 via a web browser and accessing objects via a web interface. While example client device 150 is depicted in form factors such as a laptop, mobile device, or web browser, it should be understood that the descriptions thereof are not limited to devices of these example form factors. For example, a mobile device might have a local file system accessible by multiple applications resident thereon, or might access content management system 110 via a web browser. As such, the form factor should not be considered limiting when considering client 150's capabilities. One or more functions described herein with respect to client device 150 may or may not be available on every client device depending on the specific capabilities of the device—the file access model being one such capability.

In many embodiments, client devices 150 are associated with an account of content management system 110, but in some embodiments client devices 150 can access content using shared links and do not require an account.

As noted above, some client devices can access content management system 110 using a web browser. However, client devices can also access content management system 110 using client application 152 stored and running on client device 150. Client application 152 can include a client synchronization service 156.

Client synchronization service 156 can be in communication with server synchronization service 112 to synchronize changes to objects between client device 150 and content management system 110.

Client device 150 can synchronize content with content management system 110 via client synchronization service 156. The synchronization can be platform agnostic. That is, content can be synchronized across multiple client devices of varying types, capabilities, operating systems, etc. Client synchronization service 156 can synchronize any changes (e.g., new, deleted, modified, copied, or moved objects) to objects in a designated location of a file system of client device 150.

Objects can be synchronized from client device 150 to content management system 110, and vice versa. In embodiments wherein synchronization is from client device 150 to content management system 110, a subject can manipulate objects directly from the file system of client device 150, while client synchronization service 156 can monitor directory on client device 150 for changes to files within the monitored folders.

When client synchronization service 156 detects a write, move, copy, or delete of content in a directory that it monitors, client synchronization service 156 can synchronize the changes to content management storage service 116. In some embodiments, client synchronization service 156 can perform some functions of content management storage service 116 including functions addressed above such as dividing the object into blocks, hashing the object to generate a unique identifier, etc. Client synchronization service 156 can index content within client storage index 164 and save the result in client storage index 164. Indexing can include storing paths plus the object identifier, and a unique identifier for each object. In some embodiments, client synchronization service 156 learns the object identifier from server synchronization service 112, and learns the unique client identifier from the operating system of client device 150.

Client synchronization service 156 can use storage index 164 to facilitate the synchronization of at least a portion of the objects within client storage with objects associated with a subject account on content management system 110. For example, client synchronization service 156 can compare storage index 164 with content management system 110 and detect differences between content on client storage and content associated with a subject account on content management system 110. Client synchronization service 156 can then attempt to reconcile differences by uploading, downloading, modifying, and deleting content on client storage as appropriate. Object storage service 116 can store the changed or new block for the object and update objects database 148, metadata database 146, object directory 144, object storage 142, subject database 140, etc. as appropriate.

When synchronizing from content management system 110 to client device 150, data regarding a mount, modification, addition, deletion, move of an object recorded in objects database 148 can trigger a notification to be sent to client device 150 using notification service 117. When client device 150 is informed of the change, client device 150 can make a request for changes listed in objects database 148 since the last synchronization point known to the client device. When client device 150 determines that it is out of synchronization with content management system 110, client synchronization service 156 requests object blocks including the changes, and updates its local copy of the changed objects.

In some embodiments, storage index 164 stores tree data structures wherein one tree reflects the latest representation of a directory according to server synchronization service 112, while another tree reflects the latest representation of the directory according to client synchronization service 156. Client synchronization service can work to ensure that the tree structures match by requesting data from server synchronization service 112 or committing changes on client device 150 to content management system 110.

Sometimes client device 150 might not have a network connection available. In this scenario, client synchronization service 156 can monitor the linked collection for object changes and queue those changes for later synchronization to content management system 110 when a network connection is available. Similarly, a subject can manually start, stop, pause, or resume synchronization with content management system 110.

Client synchronization service 156 can synchronize all content associated with a particular subject account on content management system 110. Alternatively, client synchronization service 156 can selectively synchronize some of the objects associated with the particular subject account on content management system 110. Selectively synchronizing only some of the objects can preserve space on client device 150 and save bandwidth.

In some embodiments, client synchronization service 156 selectively stores a portion of the objects associated with the particular subject account and stores placeholder objects in client storage for the remainder portion of the objects. For example, client synchronization service 156 can store a placeholder object that has the same filename, path, extension, metadata, of its respective complete object on content management system 110, but lacking the data of the complete object. The placeholder object can be a few bytes or less in size while the respective complete object might be significantly larger. After client device 150 attempts to access the object, client synchronization service 156 can retrieve the data of the object from content management system 110 and provide the complete object to client device 150. This approach can provide significant space and bandwidth savings while still providing full access to a subject's objects on content management system 110.

While the synchronization embodiments addressed above referred to client device 150 and a server of content management system 110, it should be appreciated by those of ordinary skill in the art that a user account can have any number of client devices 150 all synchronizing objects with content management system 110, such that changes to an object on any one client device 150 can propagate to other client devices 150 through their respective synchronization with content management system 110.

Collaboration Features

Another feature of content management system 110 is to facilitate collaboration between subjects. Collaboration features include object sharing, commenting on objects, co-working on objects in real time, instant messaging, providing presence and "seen" state information regarding objects, etc.

Sharing

Content management system 110 can manage sharing objects via sharing service 128. Sharing an object by providing a link to the object can include making the object accessible from any computing device in network communication with content management system 110. However, in some embodiments a link can be associated with access restrictions enforced by content management system 110 and Identity and Access Management (IAM) service 132. Sharing content can also include linking content using sharing service 128 to share content within content management system 110 with at least one additional subject account (in addition to the original subject account associated with the object) so that each subject account has access to the object. The additional subject account can gain access to the content by accepting the content, which will then be accessible through either web interface service 124 or directly from within the directory structure associated with their account on client device 150. The sharing can be performed in a platform agnostic manner. That is, the content can be shared across multiple client devices 150 of varying type, capabilities, operating systems, etc. The content can also be shared across varying types of subject accounts.

To share an object within content management system 110 sharing service 128 can add or associate a subject ID of a team or of one or more subject accounts with a content item in objects database 148 associated with the object, thus granting the added subject account(s) access to the object. Sharing service 128 can also remove subject IDs from being permitted to access a content item in objects database 148 to restrict a subject account's access to the object. Sharing service 128 can record object identifiers, subject identifiers given access to an object, and access levels in objects database 148. For example, in some embodiments, subject identifiers associated with a single content item can specify different permissions for respective subject identifiers with respect to the associated object.

In some embodiments, content management system 110 can include an access control list 145 which includes a description of complete access rights pertaining to a respective object. An access control list for any respective object in content management system can be derived from objects database 148. In some embodiments, it is not desirable to maintain a persistent access control list 145 for a respective object, as an access control list 145 for a respective object can be derived when needed. In some embodiments, objects can inherit access rights from another object such as ancestor objects.

To share objects outside of content management system 110, sharing service 128 can generate a custom network address, such as a uniform resource locator (URL), which allows any web browser to access the object or collection in content management system 110 without any authentication. To accomplish this, sharing service 128 can include content identification data in the generated URL, which can later be used to properly identify and return the requested object. For example, sharing service 128 can include a token identifying an object ID and optionally a subject ID in the generated URL. Upon selection of the URL, the content identification data included in the URL can be transmitted to content management system 110, which can use the received content identification data to identify the appropriate object and return the object.

In addition to generating the URL, sharing service 128 can also be configured to record in objects database 148 that a URL to the object has been created. In some embodiments, an entry into objects database 148 associated with an object can include a URL flag indicating whether a URL to the object has been created. For example, the URL flag can be a Boolean value initially set to 0 or false to indicate that a URL to the object has not been created. Sharing service 128 can change the value of the flag to 1 or true after generating a URL to the object.

In some embodiments, sharing service 128 can associate a set of permissions to a URL for an object. For example, if a subject attempts to access the object via the URL, sharing service 128 can provide a limited set of permissions for the object. Examples of limited permissions include restrictions that the subject cannot download the object, save the object, copy the object, modify the object, etc. In some embodiments, limited permissions include restrictions that only permit an object to be accessed from with a specified domain, i.e., from within a corporate network domain, or by accounts associated with a specified domain, e.g., accounts associated with a company account (e.g., @acme.com).

In some embodiments, sharing service 128 can also be configured to deactivate a generated URL. For example, each entry into objects database 148 can also include a URL active flag indicating whether the content should be returned in response to a request from the generated URL. For example, sharing service 128 can only return an object requested by a generated link if the URL active flag is set to 1 or true. Thus, access to an object for which a URL has been generated can be easily restricted by changing the value of the URL active flag. This allows a subject to restrict access to the shared object without having to move the object or delete the generated URL. Likewise, sharing service 128 can reactivate the URL by again changing the value of the URL active flag to 1 or true. A subject can thus easily restore access to the object without the need to generate a new URL.

In some embodiments, content management system 110 can designate a URL for uploading an object. For example, a first subject with a subject account can request such a URL, provide the URL to a contributing subject and the contributing subject can upload an object to the first subject's subject account using the URL.

Team Service

In some embodiments content management system 110 includes team service 130. Team service 130 can provide functionality for creating and managing defined teams of subject accounts. Teams can be created for a company, with sub-teams (e.g., business units, or project teams, etc.), and subject accounts assigned to teams and sub-teams, or teams can be created for any defined group of subject accounts. Teams service 130 can provide a common shared space for the team, private subject account folders, and access limited shared folders. Teams service 130 can also provide a management interface for an administrator to manage collections and objects within team, and can manage subject accounts that are associated with the team. Teams, sub-teams, subject accounts are all given a subject identifier in subjects database 140, and the membership to teams by subject accounts is also recorded in subjects database 140.

IAM (Identity and Access Management) Service

In some embodiments, content management system 110 includes IAM service 132. IAM service 132 can authenticate a subject account. For subject accounts with multiple levels of rights (e.g. a subject account with subject rights and administrator rights) IAM service 132 can also facilitate explicit privilege escalation to avoid unintentional actions by administrators.

Object Access

Object storage service 116 can receive a token from client application 152 that follows a request to access an object and can return the capabilities permitted to the subject account.

Presence and Seen State

In some embodiments, content management system can provide information about how subjects with which an object is shared are interacting or have interacted with the object. In some embodiments, content management system 110 can report that a subject with which an object is shared is currently viewing the object. For example, client collaboration service 160 can notify notification service 117 when client device 150 is accessing the object. Notification service 117 can then notify all client devices of other subjects having access to the same object of the presence of the subject of client device 150 with respect to the object.

In some embodiments, content management system 110 can report a history of subject interaction with a shared object. Collaboration service 126 can query data sources such as metadata database 146 and objects database 148 to determine that a subject has saved the object, that a subject has yet to view the object, etc., and disseminate this status information using notification service 117 to other subjects so that they can know who currently is or has viewed or modified the object.

Collaboration service 126 can facilitate comments associated with content, even if an object does not natively support commenting functionality. Such comments can be stored in metadata database 146.

Collaboration service 126 can originate and transmit notifications for subjects. For example, a subject can mention another subject in a comment and collaboration service 126 can send a notification to that subject letting them know that they have been mentioned in the comment. Various other object events can trigger notifications, including deleting an object, sharing an object, etc.

Collaboration service 126 can also provide a messaging platform whereby subjects can send and receive instant messages, voice calls, emails, etc.

Collaboration Objects

In some embodiments content management service can also include collaborative document service 134 which can provide an interactive object collaboration platform whereby subjects can simultaneously create collaboration objects, comment in the collaboration objects, and manage tasks within the collaboration objects. Collaboration objects can be files that subjects can create and edit using a collaboration object editor, and can contain collaboration object elements. Collaboration object elements may include a collaboration object identifier, one or more author identifiers, collaboration object text, collaboration object attributes, interaction information, comments, sharing subjects, etc. Collaboration object elements can be stored as database entities, which allows for searching and retrieving the collaboration objects. Multiple subjects may access, view, edit, and collaborate on collaboration objects at the same time or at different times. In some embodiments this can be managed by requiring two subjects access an object through a web interface and there they can work on the same copy of the object at the same time.

Collaboration Companion Interface

In some embodiments client collaboration service 160 can provide a native application companion interface for the purpose of displaying information relevant to an object being presented on client device 150. In embodiments wherein an object is accessed by a native application stored and executed on client device 150, where the object is in a designated location of the file system of client device 150 such that the object is managed by content application 152, the native application may not provide any native way to display the above addressed collaboration data. In such embodiments, client collaboration service 160 can detect that a subject has opened an object, and can provide an overlay with additional information for the object, such as collaboration data. For example, the additional information can include comments for the object, status of the object, activity of other subjects previously or currently viewing the object. Such an overlay can warn a subject that changes might be lost because another subject is currently editing the object.

In some embodiments, one or more of the services or storages/databases discussed above can be accessed using public or private application programming interfaces.

Certain software applications can access object storage 142 via an API on behalf of a subject. For example, a software package such as an application running on client device 150, can programmatically make API calls directly to content management system 110 when a subject provides authentication credentials, to read, write, create, delete, share, or otherwise manipulate content.

A subject can view or manipulate content stored in a subject account via a web interface generated and served by web interface service 124. For example, the subject can navigate in a web browser to a web address provided by content management system 110. Changes or updates to content in the object storage 142 made through the web interface, such as uploading a new version of an object, can be propagated back to other client devices associated with the subject's account. For example, multiple client devices, each with their own client software, can be associated with a single account and objects in the account can be synchronized between each of the multiple client devices.

Client device 150 can connect to content management system 110 on behalf of a subject. A subject can directly interact with client device 150, for example when client device 150 is a desktop or laptop computer, phone, television, internet-of-things device, etc. Alternatively, or additionally, client device 150 can act on behalf of the subject without the subject having physical access to client device 150, for example when client device 150 is a server.

Some features of client device 150 are enabled by an application installed on client device 150. In some embodiments, the application can include a content management system specific component. For example, the content management system specific component can be a stand-alone application 152, one or more application plug-ins, and/or a browser extension. However, the subject can also interact with content management system 110 via a third-party application, such as a web browser, that resides on client device 150 and is configured to communicate with content management system 110. In various implementations, the client-side application 152 can present a subject interface (UI) for a subject to interact with content management system 110. For example, the subject can interact with the content management system 110 via a file system explorer integrated with the file system or via a webpage displayed using a web browser application.

In some embodiments, client application 152 can be configured to manage and synchronize content for more than one account of content management system 110. In such embodiments client application 152 can remain logged into multiple accounts and provide normal services for the multiple accounts. In some embodiments, each account can appear as folder in a file system, and all objects within that folder can be synchronized with content management system 110. In some embodiments, client application 152 can include a selector to choose one of the multiple accounts to be the primary account or default account.

Third Party Services

In some embodiments content management system 110 can include functionality to interface with one or more third party services such as workspace services, email services, task services, etc. In such embodiments, content management system 110 can be provided with login credentials for a subject account at the third party service to interact with the third party service to bring functionality or data from those third party services into various subject interfaces provided by content management system 110.

While content management system 110 is presented with specific components, it should be understood by one skilled in the art, that the architectural configuration of system 100 is simply one possible configuration and that other configurations with more or fewer components are possible. Further, a service can have more or less functionality, even including functionality described as being with another service. Moreover, features described herein with respect to an embodiment can be combined with features described with respect to another embodiment.

While system 100 is presented with specific components, it should be understood by one skilled in the art, that the architectural configuration of system 100 is simply one possible configuration and that other configurations with more or fewer components are possible.

Figure 2:
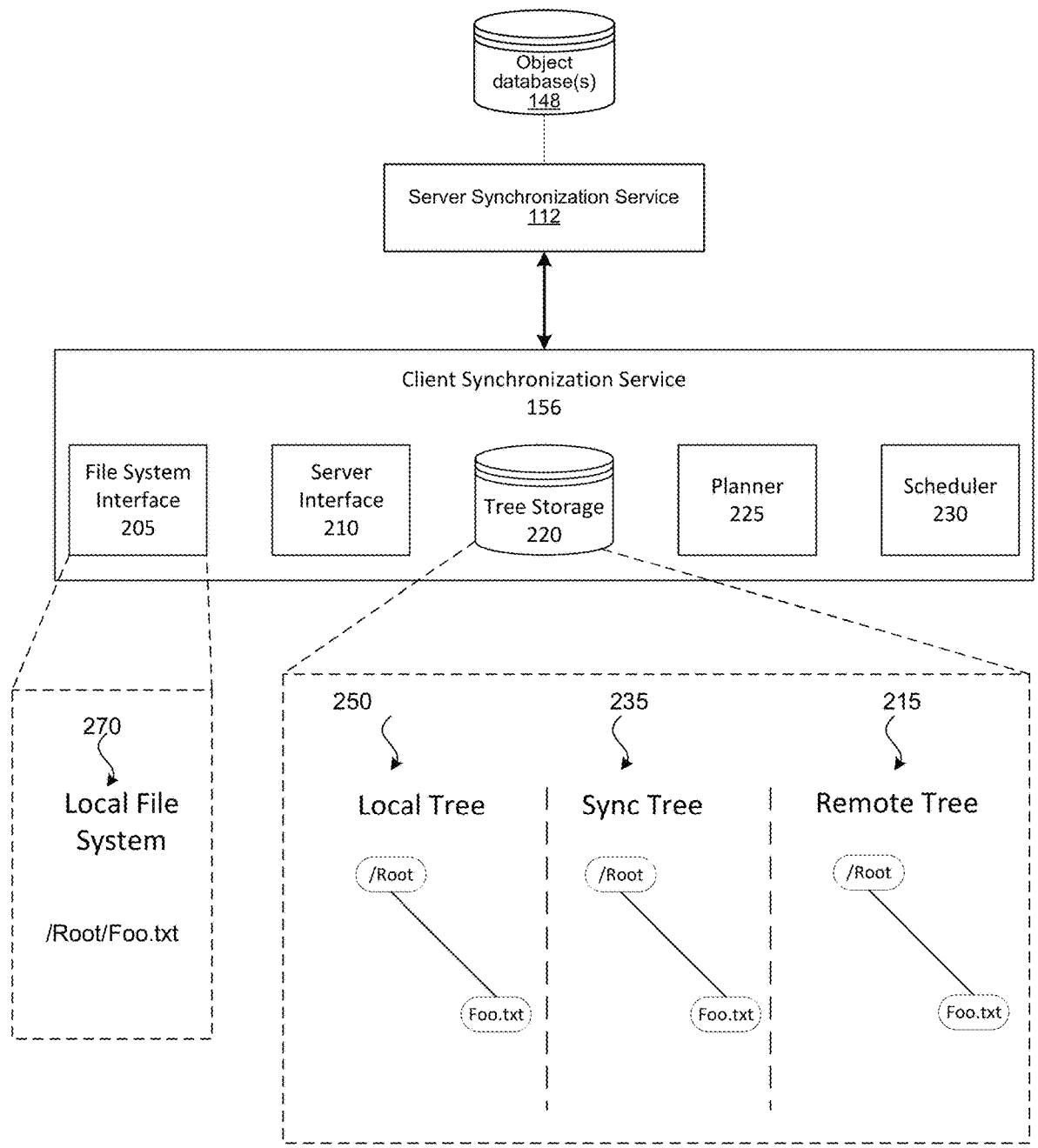
FIG. 2 illustrates an example of a client synchronization service, in accordance with some aspects of the present technology.

FIG. 2 shows an example of a client synchronization service 156, in accordance with some embodiments. Client synchronization service 156 may be implemented in the client device 150 of FIG. 1. However, in some embodiments, client synchronization service 156 may be implemented on another computing device. Client synchronization service 156 is configured to synchronize changes to objects between content management system 110 and the client device 150 on which client synchronization service 156 runs.

Client synchronization service 156 may include file system interface 205, server interface 210, tree storage 220, planner 225, and scheduler 230. Additional or alternative components may also be included.

File system interface 205 is configured to process changes to objects on local file system 270 of client device 150 and update local tree 250 or to make changes to local file system 270. For example, file system interface 205 can detect changes to objects on local file system 270 of client device 150. Changes may also be made and detected via client application 152 of FIG. 1. File system interface 205 may make updates to local tree 250. The updates to local tree 250 may be made based on the changes (new, deleted, modified, copied, renamed, or moved objects) to objects on the client device.

Server interface 210 is configured to aid in the processing of remote changes to objects at content management system 110 and updating of remote tree 210. For example, server interface 210 can be in communication with server synchronization service 112 to synchronize changes to objects between client device 150 and content management system 110. Changes (new, deleted, modified, copied, renamed, or moved objects) to objects at content management system 110 may be detected and updates may be made to remote tree 210 to reflect the changes at content management system 110. Server interface 210 is also configured to aid in the communicating of local changes to objects at local file system 270 to server synchronization service 112 to update object database 148.

Tree storage 220 is configured to store and maintain the tree data structures used by client synchronization service 156. For example, tree storage 220 may store local tree 250, sync tree 235, and remote tree 210. In some embodiments, tree storage 220 may store the tree data structures in persistent memory (e.g., a hard disk or other secondary storage device) as well as in main memory (e.g., RAM or other primary storage device) in order to reduce latency and response time. For example, on start-up of the client device or client synchronization service 156, the tree data structures may be retrieved from persistent memory and loaded into main memory. Tree storage 220 may access and update the tree data structures on main memory and, before the client device or client synchronization service 156 is shut down, tree storage 220 may store the updated tree data structures in persistent memory.

Remote tree 210 represents a server state or the state of objects stored remotely from the client device (e.g., on a server of the content management system). Local tree 250 represents a file system state or the state of the corresponding objects stored locally on the client device. Sync tree 235 represents a merge base for the local tree and the remote tree. The merge base may be thought of as a common ancestor of the local tree and the remote tree or a last known synced state between the local tree and the remote tree.

Each tree data structure (e.g., remote tree 210, sync tree 235, or local tree 250) may include one or more nodes. Each node in a tree data structure may represent an object (e.g., a file, document, folder, etc.). Each node in a tree data structure may contain data such as, for example, a directory object identifier specifying the object identifier of a parent node of the object, an object name for the object, an object identifier for the object, and metadata for the object.

Planner 225 is configured to detect differences between the server state associated with content management system 110 and the file system state associated with the client device 150 based on the state of the tree data structures. For example, planner 225 may determine if there is a difference between remote tree 210 and sync tree 235. A difference between remote tree 210 and sync tree 235 indicates that an action performed remotely on one or more objects stored at content management system 110 has caused the server state and the file system state to become out of sync. Similarly, planner 225 may also determine if there is a difference between local tree 250 and the sync tree 235. A difference between local tree 250 and sync tree 235 indicates that an action performed locally on one or more objects stored in local file system 270 on client device 150 has caused the server state and the file system state to become out of sync. If a difference is detected, planner 225 generates a set of operations that synchronize the tree data structures.

In some scenarios, a set of operations generated based on a difference between the remote tree and the sync tree and a set of operations generated based on a difference between the local tree and the sync tree may conflict. Planner 225 may also be configured to merge the two sets of operations into a single merged plan of operations.

Scheduler 230 is configured to take the generated plan of operations and manage the execution of those operations. According to some embodiments, scheduler 230 converts each operation in the plan of operations into a series of one or more tasks that need to be executed in order to perform the operation. In some scenarios, some tasks may become out dated or no longer relevant. Scheduler 230 is configured to identify those tasks and cancel them.

When a difference exists between local tree 250 and sync tree 235, a change needs to be synchronized to content management system 110. To synchronize a change in local file system 270 to content management system 110, client synchronization service 156 can commit an intent to server synchronization service 112 pertaining to specific synchronization operations. To commit the intent, client synchronization service 156 on client device 150 records an intent to commit an operation at client device 150. Client synchronization service 156 can record the intent to commit the operation durably on disk or memory at client device 150 to track the pending commit. Client device 150 can store dirty commit records and track modifications until an event triggers removal of the pending commit(s), such as a failure or success. Client synchronization service 156 also commits the operation to server synchronization service 112 by sending a message to server synchronization service 112 requesting to commit the operation.

Server synchronization service 112 can send a return message indicating whether the commit to content management system 110 succeeded or indicating an error. Only once client synchronization service 156 learns that the commit succeeded will client synchronization service 156 update remote tree 610 and sync tree 620 to include the synchronized operation and clear the intent to commit the operation from client device 150.

Client application 152 can learn of a change existing at a server by requesting information regarding events occurring on objects recorded in object database 148 since a last synchronization time known to the client device. In some embodiments, client synchronization service 156 makes a request for updated information periodically, or in response to receiving notifications about possible changes. When a change has occurred in the account at the content management system, server synchronization service 112 can send information about the operation that was performed to client synchronization service 156 which can update remote tree 215. Thereafter, client synchronization service 156 can detect a difference between remote tree 215 and sync tree 235 indicating that local file system 270 needs to be updated. Planner 225 can identify operations needed to update local file system 270, and server interface 210 can request any data, such as blocks making up objects, etc. from content management system 110.

Client synchronization service 156 can update local file system 270, local tree 250, and sync tree 235 to bring the system into a synchronized state. Additionally, client synchronization service 156 can store information identifying the synchronization time pertaining to the information received from object database 148 to indicate that client application is up to date to at least the last synchronization time. In some embodiments, the last synchronization time pertains to a row in object database 148, and can be stored as part of a cryptographically signed cursor that is received from content management system 110. The next time client synchronization service requests updated information, it will supply the cursor to identify a point in object database 148 from which to begin reading.

In some embodiments, local file system 270 on client device 150 can include an object that is identified as an ignore file. An ignore file can include one or more rules that can be used by client synchronization service 156 to identify objects that are exempt from synchronization with content management system 110. Rules in the ignore file may identify objects that are exempt from synchronization with content management system 110 based on any attribute associated with an object, such as, for example, filename, extension, path, location, pattern, strings, metadata characteristics, or any combination thereof.

Upon detecting and processing an ignore file, client synchronization service 156 can apply ignore file rules to objects that are presently stored on local file system 270. For example, client synchronization service 156 can identify objects that are subject to the ignore file rules (i.e. exempt from synchronization) but were synchronized with content management system 110 prior to processing the ignore file. Client synchronization service 156 can trigger removal of such objects from content management system 110 by marking the object with an ignore file indicator. In one example, the ignore file indicator may be a flag that is an extended attribute of the object and identifies the object as ignored. In other examples, the ignore file indicator can be any type of metadata associated with the object. The ignored object may then be represented in the local tree 250 as an object that is prohibited from synchronizing with the content management system 110. Server synchronization service 112 can then cause the object to be removed from content management system 110.

In another embodiment, client synchronization service 156 can maintain a list of ignored objects that can also be accessed by server synchronization service 112. Client synchronization service 156 can trigger removal of ignored objects from content management system 110 by adding it to the list of ignored objects.

In a further embodiment, client synchronization service 156 can dynamically apply ignore file rules to any new objects that are stored on local file system 270. For example, client synchronization service 156 can detect that a newly saved file has an attribute that matches a rule in an ignore file. Client synchronization service 156 can then denote that the new file is an ignored object by marking it with an ignore file indicator. By applying ignore file rules to new objects in a dynamic fashion, client synchronization service 156 can avoid the computational and network overhead associated with the synchronization process such as dividing the object into blocks and transferring the object/blocks over the network. Additional details relating to the ignore file and the present technology are set forth below.

Figure 3:
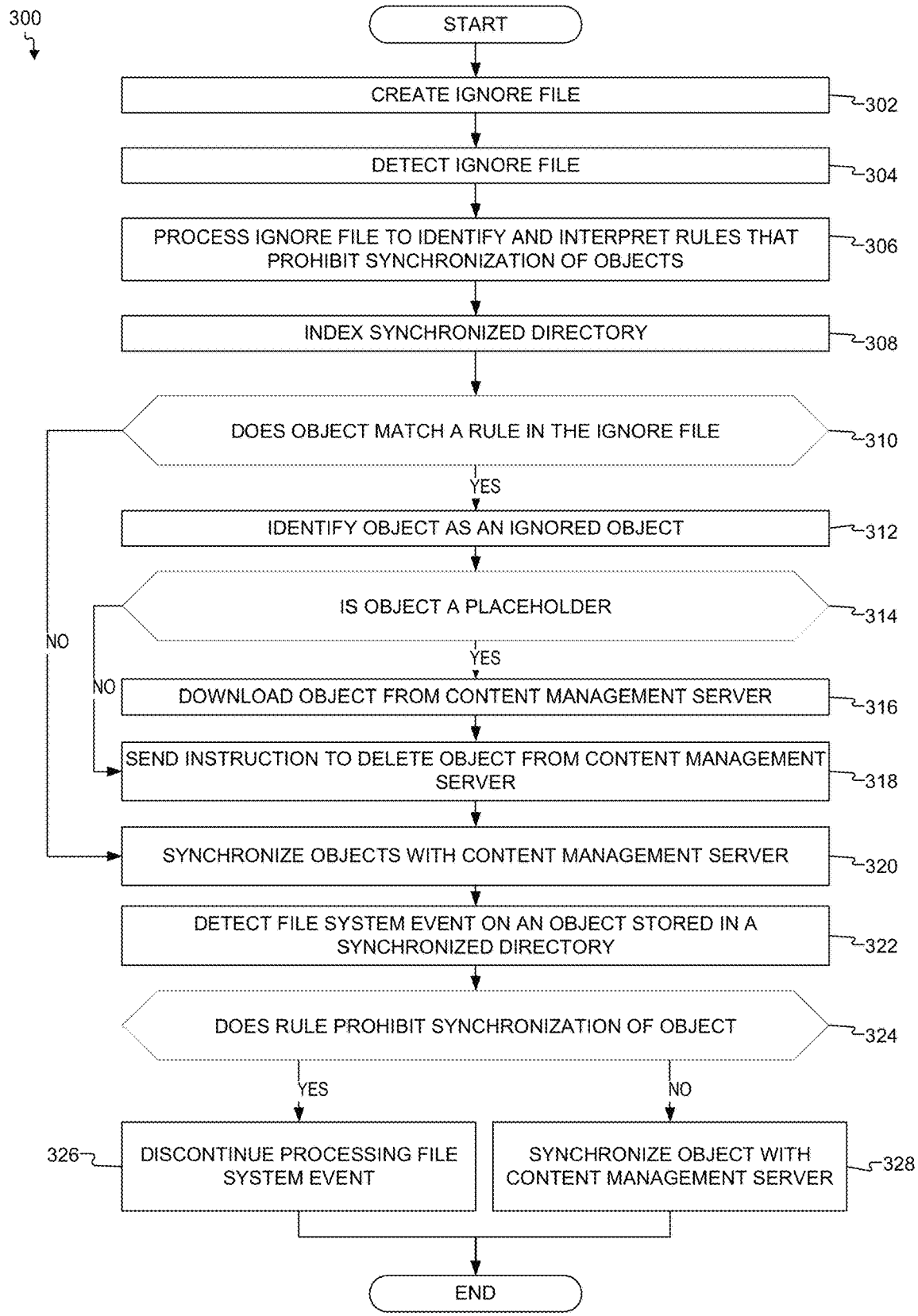
FIG. 3 illustrates an example method for creating and utilizing an ignore file in a synchronized content management system, in accordance with some aspects of the present technology.

FIG. 3 illustrates an example method 300 for creating and utilizing an ignore file in a synchronized content management system in accordance with the present technology. Although the example method 300 depicts a particular sequence of operations, the sequence may be altered without departing from the scope of the present disclosure. For example, some of the operations depicted may be performed in parallel or in a different sequence that does not materially affect the function of the method 300. In other examples, different components of an example device or system that implements the method 300 may perform functions at substantially the same time or in a specific sequence.

According to some examples, the method includes creating an ignore file at block 302. In one example, a user may create an ignore file manually by utilizing a text editor or other suitable word processing software. The user may enter one or more rules in the ignore file that utilize syntax or commands that can be interpreted by client synchronization service 156. In some examples, the syntax used to create the rules can be the same or similar to GLOBS, as used by the GITHUB code hosting platform.

In some embodiments, client device 150 may provide the user with an ignore file template. The ignore file template can include instructions, commands, rules, syntax, etc. that a user can edit or otherwise utilize to create an ignore file.

In other embodiments, content management system 110 or client device 150 may present a user interface for creating the ignore file. The user interface can include one or more prompts or tools for a user to select attributes that are associated with an object that is to be ignored. The attributes or criteria used to identify objects can include filename, extension, path, location, pattern, strings, metadata characteristics, or any combination thereof. For example, a rule may specify that files that are larger than 1 GB should not be synchronized with content management system 110. The attributes that are used to define rules may also be combined by using Boolean operators such as AND, OR, and NOT.

In some techniques, the ignore file can be stored in any directory within a directory tree that is synchronized with content management system 110. In one example, the rules in the ignore file can be applied to objects stored in the directory that the ignore file is stored and/or to objects stored in any subordinate directories. Alternatively, the ignore file may include rules that specify a directory or path that may or may not be in the same path or directory as the ignore file. In some embodiments, a user may create multiple ignore files that can be stored in different locations within the directory tree and each ignore file can include rules that are applied to objects within the respective directory tree.

In some examples, the user interface can present a listing of objects that are affected by the rules. For example, if the user specifies a rule that ignores all files that are greater than a particular file size, the user interface can display the files that meet that criteria so that the user can confirm the rule is correct and does not inadvertently ignore objects that should be synchronized to content management system 110. In another example, the user interface may update the list of affected objects dynamically as the user adds or removes rules or as the user modifies existing rules.

According to some examples, the method includes detecting, by client synchronization service 156 on a client device 150, an ignore file at block 304. As noted above, the ignore file can be stored in a synchronized directory in local file system 270. In some embodiments, the ignore file can be detected based on its filename or its file extension. For example, an ignore file may have an extension of *.ignore.

At step 306, client synchronization service 156 can process the ignore file to identify and interpret rules that prohibit synchronization of objects. In processing the ignore file, the client synchronization service 156 can open the ignore file and read its contents. In some embodiments, the operation of opening and reading a file by client synchronization service 156 is only performed on files that are identified as ignore files at block 304 and is not performed on other types of files or objects.

Upon reading the contents of the ignore file, client synchronization service 156 can recognize and interpret one or more rules stored in the ignore file. As noted above, rules in the ignore file are defined by a user of client device 150 in order to prohibit objects that match the rule's criteria from being synchronized with content management system 110. In some embodiments, client synchronization service 156 can extract rules from the ignore file and store them in a memory on client device 150.

In a further example, client synchronization service 156 can process the ignore file and determine that it does not contain any rules or determine that the file is corrupted or otherwise unreadable. Upon determining that an ignore file is empty or corrupted, client synchronization service 156 can alert the user that a problem has been detected with the ignore file. In some embodiments, a user interface can be launched that can be used to edit the ignore file. The user interface may provide an indication of possible errors or suggest edits to correct improper syntax.

Upon detection of an empty or corrupted ignore file, client synchronization service 156 may pause any ongoing synchronization process and/or delay the next synchronization process in order to prevent the synchronization of any objects that the user intended to ignore. In some embodiments, client synchronization service 156 may prompt the user to confirm whether the synchronization process should continue for all objects without consideration of the ignore file.

According to some examples, the method includes indexing the synchronized directory at block 308. Client synchronization service 156 can index content within local file system 270 and save results in client storage index 164. Indexing can include storing object paths as well as object identifiers for each object. As noted above, one or more ignore files can be saved in one or more directories within the synchronized directory tree. The indexing process can be repeated for any directory or subdirectory when a new rule from an ignore file is detected so that the new rule is dynamically applied to existing files in the directory or subdirectory.

During the indexing process, client synchronization service 156 can apply the rule or rules within the ignore file to any object in or under the directory in which the ignore file is stored. In some embodiments, client indexing service 156 can apply the ignore file rules to folders or objects that have the same sharing properties as the folder in which the ignore file is saved. For example, a folder's sharing properties can be different if a user has explicitly shared that folder. In one example, an object is explicitly shared when a user selects options that permit one more other users to access the shared object. In some instances, the owner of the shared object can set different levels of access or permission to the shared object. For example, a user may share an object that grants other users permission to read/view the shared object, edit the shared object, or comment on the shared object. In further examples, the sharing properties can include an expiration date such that objects are not shared indefinitely. In addition, a sub-folder within the directory tree may inherit sharing properties from an ancestor folder that has been explicitly shared. In some instances, client synchronization service may alert the user that certain folders have different sharing properties and will not be subject to the ignore file rules.

According to some examples, during the indexing of the synchronized directory, the method can include determining whether an object matches a rule in the ignore file at block 310. If there are no objects that match rules in the ignore file, the method can proceed to block 320 in which objects stored on client device 150 can be synchronized with content management system 110.

If client synchronization service 156 determines that an object matches a rule in the ignore file, the method can proceed to block 312 in which the object is identified as an ignored object. For example, the client device 150 illustrated in FIG. 1 may mark an object that matches the rule in the ignore file by writing a flag that identifies the object as ignored as an extended attribute of the object.

In other examples, client synchronization service 156 can create and store an ignore file list. Upon determining that an object matches a rule in the ignore file, client synchronization service 156 can add information that identifies that object to the ignore file list. For example, the ignore file list can include information associated with the object such as its name, location, unique ID, size, etc. The ignore file list can be accessed by server synchronization service 112.

According to some examples, the method includes determining that the object that is identified as an ignored object is a placeholder object at block 314. A placeholder object is an object that has an appearance of a complete file in the synchronized directory on a client device, but does not contain the complete data of the file. The complete data for a placeholder object is stored in association with the user account at the content management system server.

If an ignored object is identified as a placeholder object, the method can proceed to block 316 to download the data for the placeholder object from content management system 110 to client device 150. Downloading the data for a placeholder object that is marked as ignored ensures that the data will not be lost when the ignored object is subsequently removed from content management system 110.

According to some examples, the method includes sending a communication to a content management system server that instructs the content management system server to delete the ignored object from a user account at the content management system server at block 318. In some embodiments, client device 105 can send a communication to content management system 110 that instructs the content management system 110 to delete the ignored object from a user account that is synchronized to the content management system server.

In other embodiments, client synchronization service 156 can send a communication to server synchronization service 112 to alert it of a change in the ignore file list. In response, server synchronization service 112 can access the ignore file list and determine any differences from the last time it accessed the ignore file list. Server synchronization service 112 can identify new objects that are to be ignored and removed from content management system 110 as well as objects that have been removed from the ignore file list and are now eligible to be synchronized.

According to some examples, the method can include block 320, in which it performs synchronization of objects on client device 105 to content management system 110. During the synchronization process, client synchronization service 156 and server synchronization service 112 can then attempt to reconcile differences between client device 105 and content management system 110 by uploading, downloading, modifying, and deleting content as appropriate, which can include deleting ignored objects from content management system 110. In some embodiments, the synchronization process can include synchronizing the ignore file itself to a user account at the content management system server unless there is a rule within the ignore file that indicates that the ignore file is prohibited from being synchronized to the content management system server.

According to some examples, the method includes detecting a file system event on an object stored in a synchronized directory at block 322. A file system event can include modifying, saving, deleting, or moving objects in a synchronized directory. Upon detecting a file system event, the method can proceed to block 324 and determine whether an ignore file rule prohibits synchronization of the object associated with the file system event. If a rule prohibits synchronization of the object associated with the file system event, the method can discontinue processing the file system event at block 326. If a rule does not prohibit synchronization of the object associated with the file system event, the method can synchronize the object with content management server 110 at block 328.

In one example, the file system event may correspond to a user saving a new object having a *.exe file extension into a synchronized directory that includes an ignore file with a rule that prohibits synchronization of executable (*.exe) files. In this instance, client synchronization service 156 may mark the new object as ignored and discontinue processing of the file system event.

In some embodiments, client synchronization service 156 may determine that a new object is not associated with a unique ID assigned by the content management system prior to determining that the object is prohibited from synchronizing with the content management system. Upon making the determination that a new object is not associated with a unique ID, client synchronization service 156 may assign a unique ID to the new object or may request that a unique ID be assigned by content management system 110. Upon receiving the unique ID, client synchronization service 156 can proceed to mark the object as ignored if it determines that the object satisfies criteria in an ignore file rule.

Figure 4:
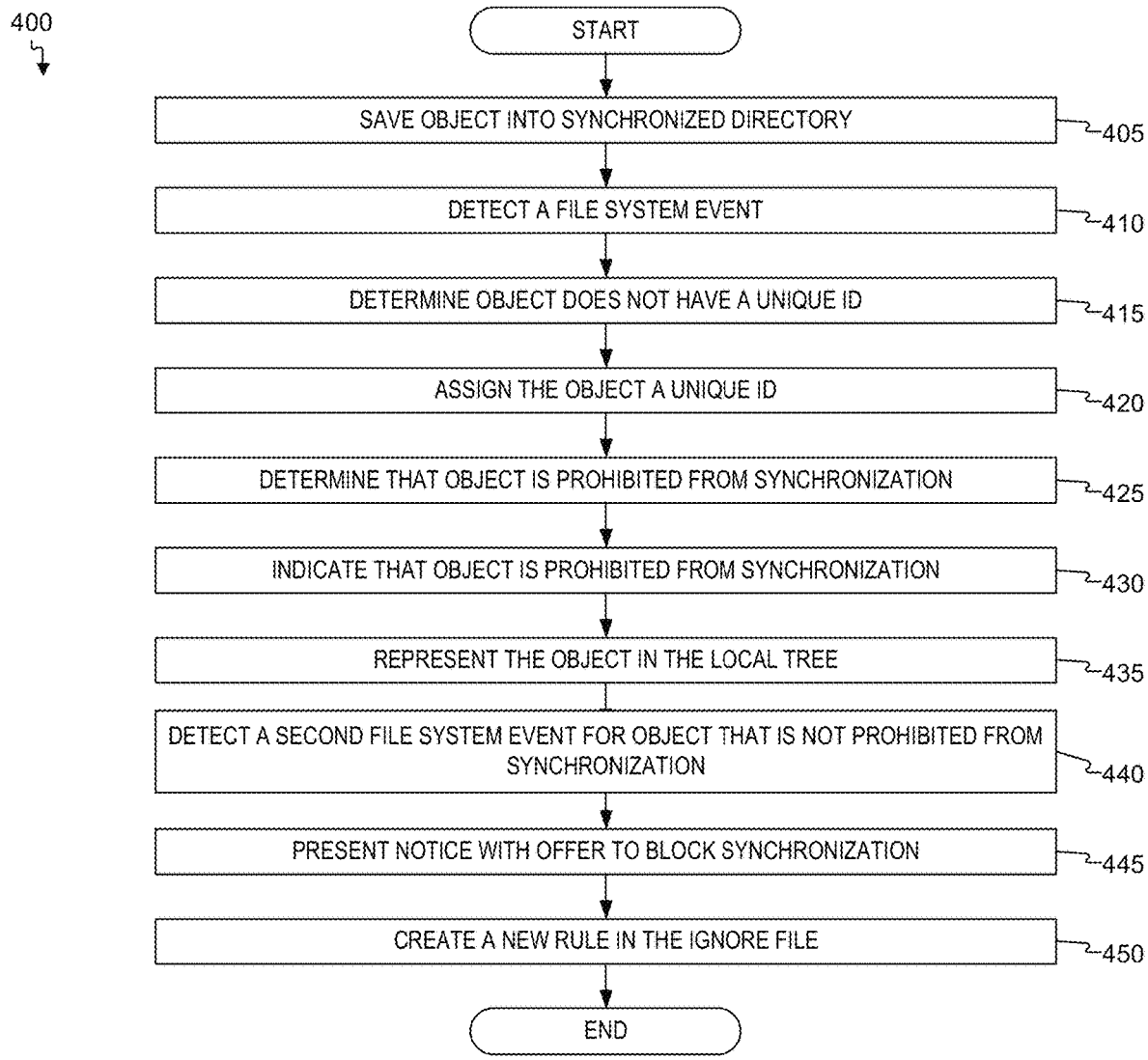
FIG. 4 illustrates an example method for utilizing an ignore file in a synchronized content management system, in accordance with some aspects of the present technology.

FIG. 4 illustrates an example method 400 for utilizing an ignore file in a synchronized content management system in accordance with the present technology. Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

According to some examples, the method includes saving, by a client device, an object into a synchronized directory at block 405. For example, a user may save a new object such as a file into a synchronized directory within local file system 270 of client device 150. As noted above, saving an object into a synchronized directory is an example of a file system event.

According to some examples, the method can proceed to block 410 wherein client synchronization service 156 can detect a file system event. In one example, the file system event can correspond to an object that is stored in a synchronized directory associated with a user account of a content management system.

According to some examples, the method can include determining that the object associated with the file system event has not been assigned a unique ID at block 415. After determining that the object has not been assigned a unique ID, the method can proceed to block 420 and assign the object a unique ID. In some examples, the unique ID is assigned by content management system 110 before the object is assessed against rules from the ignore file. For example, the content management system 110 illustrated in FIG. 1 may assign the object the unique ID prior to determining that the object is prohibited from synchronizing with the content management system.

According to some examples, the method can proceed to block 425, which includes determining that the file system event corresponds to an object that is prohibited from synchronizing with content management system by a user defined rule on a client device. For example, client synchronization service 156 may determine that the file system event corresponds to an object that is prohibited from synchronizing with content management system 110 by a user defined rule from an ignore file that is stored on a synchronized directory on client device 150. In one example, the file system event is one that would trigger a synchronization of the object but for the user defined rule from the ignore file. In another example, the determination that the file system event corresponds to an object that is prohibited from synchronizing is responsive to the detecting the file system event. Upon determining that the object is subject to a rule from the ignore file, the system can discontinue processing of the file system event.

According to some examples, the method can proceed to block 430, which includes indicating that the object is prohibited from synchronizing with the content management system by writing a flag that identifies the object as ignored. In some examples, the flag can be an extended attribute of the object.

According to some examples, the method includes representing the object that is prohibited from synchronizing with the content management system in a local tree at block 435. For example, client synchronization service 156 can represent the object that is prohibited from synchronizing with the content management system in a local tree. The local tree is a representation, maintained by the client synchronization service, of the synchronized directory on the client device. The object is marked with a flag that indicates that it is prohibited from being synchronized with the content management system. Changes in the local tree relative to a sync tree trigger a synchronization of the changes to the content management system except when the object represented in the local tree is marked with the flag.

According to some examples, the method includes detecting a second object in the synchronized directory that is not prohibited from synchronization by a user-defined rule at block 440. In some embodiments, the second object may have a file size that is larger than a pre-defined threshold or it may be on a list of file types that are often prevented from synchronization by other users of the content management system.

According to some examples, the method includes causing a notification to be presented to a user of the user account offering to prohibit the second object from synchronization at block 445. For example, the client synchronization service 156 may cause a notification to be presented to a user of the user account offering to prohibit the second object from synchronization.

According to some examples, the method can include creating a new rule in the ignore file at block 450. For example, if the user agrees that the second object should be excluded from synchronization, client synchronization service 156 can create a new rule for inclusion in the user-defined rules that prohibit the second object from synchronization at block 450.

FIG. 5 illustrates an example ignore file 500 for use in a synchronized content management system in accordance with the present technology. Ignore file 500 can include one or more rules that can be used to identify objects that are exempt from synchronization with a content management server. In one example, ignore file 500 can utilize syntax that is the same or similar to the syntax used by GLOBS from GITHUB.

For example, ignore file 500 can include one or more descriptive fields such as field 502. In this instance, field 502 can include a leading character such as a '#' that designates the text that follows as a comment that is for the benefit of the user and can be ignored during processing by client synchronization service 156.

Ignore file 500 can also include one or more rules such as the rules included in fields 504, 506, and 508. For example, field 504 identifies a directory having the name "private" that is located inside the "My Documents" folder. In this example, the two asterisks '' is a wildcard character used to match the partial path. Based on this rule, client synchronization service 156 will ignore all files located in this directory and will not synchronize them to content management system 110. In this example, field 504** also includes a comment indicating that the user does not wish to synchronize documents in his or her private folder.

In another example, ignore file 500 can include field 506 with a rule that identifies all files with the extension '.key' as being ignored. Based on this rule, client synchronization service 156 will ignore synchronization of any file having this extension that is saved in the synchronized folder in which the ignore file is stored. Field 506 also includes a comment indicating that these types of files are secret and should not be stored on the cloud.

In another example, ignore file 500 can include field 508 with a rule that identifies all files with '.png' and '.gif' file extensions in the 'My Photos' folder as being ignored. Based on this example, any other files in the folder will be synchronized (e.g. '.jpg' files). The syntax of this rule utilizes the form of '+(pattern|pattern)' which can be used to match one or more occurrences of the patterns provided. Field 508 also includes a comment that indicates purpose of this rule.

In further examples, the syntax for creating rules in ignore file 500 can include additional commands. For example:

The '*' character can be used to match 0 or more characters in a single path portion.

The "?" character can be used to match 1 character

The '[ . . . ]' characters can be used to match a range of characters.

The syntax 'A!(pattern|pattern|pattern)' can be used to match anything that does not match any of the patterns provided.

The syntax '?(pattern|pattern|pattern)' can be used to match zero or one occurrence of the patterns provided.

The syntax '+(pattern|pattern|pattern)' can be used to match one or more occurrences of the patterns provided.

The syntax '*(a|b|c)' can be used to match zero or more occurrences of the patterns provided.

The syntax '@(pattern|pat*|pat?erN)' can be used to match exactly one of the patterns provided The foregoing examples of syntax are provided solely for illustrative purposes and in no way limit the implementation of ignore file 500. Those skilled in the art will recognize that ignore file 500 can be designed or implemented using any suitable syntax, commands, scripting, programming languages, etc. in accordance with the present technology.

Figure 6:
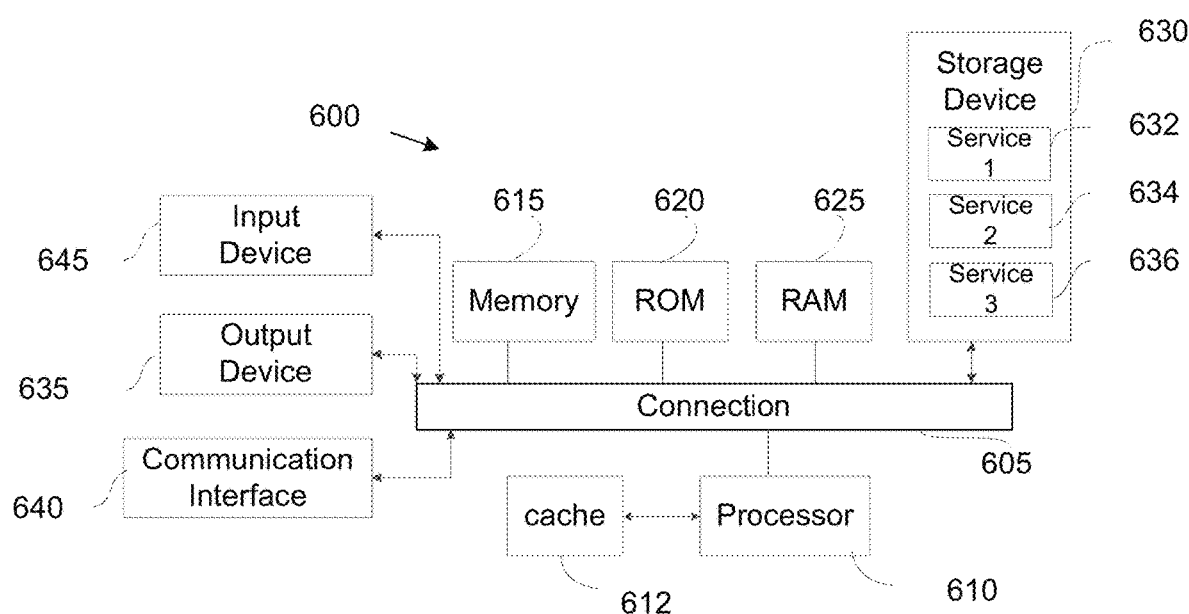
FIG. 6 illustrates an example system for implementing some aspects of the present technology.

FIG. 6 shows an example of computing system 600, which can be for example any computing device making up client device 150, content management system 110, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 600 includes at least one processing unit (CPU or processor) 610 and connection 605 that couples various system components including system memory 615, such as read-only memory (ROM) 620 and random access memory (RAM) 625 to processor 610. Computing system 600 can include a cache of high-speed memory 612 connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement, and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
    detecting a file system event associated with a synchronized directory;
    detecting, by a client synchronization service on a client device, an ignore file in the synchronized directory, wherein the client synchronization service on the client device is configured to synchronize each change to a plurality of objects in the synchronized directory;
    interpreting a rule within the ignore file, wherein the rule is defined by a user of the client device and the rule within the ignore file applies to a subset of the plurality of objects in the synchronized directory, wherein when processing changes to the plurality of objects in the synchronized directory the processing is configured to exclude the subset of the plurality of objects from being synchronized with a content management system server based on the rule;
    storing the rule in a memory;
    indexing the synchronized directory;
    during the indexing of the synchronized directory, identifying an object associated with the file system event that matches the rule in the ignore file by writing a flag that identifies the object as ignored as an extended attribute of the object, wherein the object that matches the rule existed in the synchronized directory prior to the detecting the ignore file;
    adding the object associated with the file system event to a data structure; and
    synchronizing the synchronized directory, wherein the added object is excluded from synchronization.

2. The method of claim 1, comprising:
    upon the detecting the ignore file, processing the ignore file, wherein the processing the ignore file includes opening the ignore file and reading contents of the ignore file, wherein the reading the contents of the ignore file is a special function performed by the client synchronization service that is not performed on other types of files; and
    recognizing the rule stored in the ignore file.

3. The method of claim 1, comprising:
    presenting a user interface for creating the ignore file, wherein the user interface prompts the user to identify at least one characteristic associated with an object to be ignored, wherein the at least one characteristic includes a file name, a file extension, a pattern, a string, or a metadata characteristic.

4. The method of claim 1, comprising:
    presenting a user interface for creating the ignore file, wherein the user interface presents a listing of objects affected by existing rules.

5. The method of claim 1, wherein the ignore file can be stored in any directory within a directory tree under a root of the synchronized directory, the method further comprising:
    applying the rule within the ignore file to any object in the directory in which the ignore file is stored when the respective object has a same sharing property as the directory, wherein the rule is not applied to any folder or its subordinate folders having separate sharing properties.

6. The method of claim 1, comprising:
sending a communication to the content management system server, the communication instructing the content management system server to delete the object from a user account at the content management system server.

7. The method of claim 1, wherein the indexing the synchronized directory is repeated when a new rule is detected, wherein the new rule is dynamically applied to existing files in the synchronized directory.

8. The method of claim 1, synchronizing the ignore file to a user account at the content management system server unless the rule within the ignore file indicates that the ignore file is prohibited from being synchronized to the content management system server.

9. The method of claim 1, further comprising:
identifying an error in the ignore file;
pausing synchronization of the synchronized directory based on the identified error; and
providing, on a user interface, the identified errors.

10. A method comprising:
detecting, by a client synchronization service on a client device, an ignore file in a synchronized directory, wherein the client synchronization service is configured to synchronize each change to a plurality of objects in the synchronized directory;
detecting, by the client synchronization service, a file system event on an object stored in the synchronized directory associated with a user account of a content management system;
interpreting a rule within the ignore file, wherein the rule is defined by a user of the client device and the rule within the ignore file applies to a subset of the plurality of objects in the synchronized directory, wherein when processing the file system event the client synchronization service is configured to exclude the object from being synchronized with a content management system server based on the rule;
responsive to the detecting the file system event, determining that the object is prohibited from synchronizing with the content management system based on the rule within the ignore file, wherein the file system event would trigger a synchronization of the object but for the ignore file in the synchronized directory; and
adding the object associated with the file system event to a data structure;
discontinuing processing of the file system event on the added object responsive to the ignore file in the synchronized directory, wherein discontinuing processing of the file system event includes preventing the client synchronization service from processing changes to the added object; and
synchronizing the plurality of objects in the synchronized directory, wherein the added object is excluded from synchronization.

11. The method of claim 10, comprising:
saving, by a client device, the object into the synchronized directory, wherein the saving the object triggers the detection of the file system event.

12. The method of claim 10, comprising:
indicating that the object that is prohibited from synchronizing with the content management system by writing a flag that identifies the object as ignored as an extended attribute of the object.

13. A system comprising: a storage configured to store instructions; and
a processor configured to execute the instructions and cause the processor to:
detect a file system event associated with a synchronized directory;
detect, by a client synchronization service on a client device, an ignore file in a synchronized directory, wherein the client synchronization service on the client device is configured to synchronize each change to a plurality of objects in the synchronized directory;
interpret a rule within the ignore file, wherein the rule is defined by a user of the client device and the rule within the ignore file applies to a subset of the plurality of objects in the synchronized directory, wherein when processing changes to the plurality of objects in the synchronized directory the processing is configured to exclude the subset of the plurality of objects from being synchronized with a content management system server, based on the rule;
store the rule in a memory;
index the synchronized directory; and
identify, during the indexing of the synchronized directory, an object associated with the file system event that matches the rule in the ignore file by writing a flag that identifies the object as ignored as an extended attribute of the object, wherein the object that matches the rule existed in the synchronized directory prior to the detecting the ignore file;
adding the object associated with the file system event to a data structure; and
synchronizing the synchronized directory, wherein the added object is excluded from synchronization.

14. The system of claim 13, wherein the processor is configured to execute the instructions and cause the processor to:
process the ignore file by opening the ignore file and reading contents of the ignore file, wherein the process is a special function performed by processor that is not performed on other types of files; and
recognize the rule stored in the ignore file.

15. The system of claim 13, wherein the rule stored in the ignore file includes text that matches a syntax that is recognizable by the processor.

16. The system of claim 13, wherein the processor is configured to execute the instructions and cause the processor to:
identify a directory that is subordinate to the synchronized directory and has a sharing property that is the same as the synchronized directory, and
apply the rule within the ignore file to any object in the directory.

17. The system of claim 13, wherein the processor is configured to execute the instructions and cause the processor to:
send a communication to the content management system server, the communication instructing the content management system server to delete the object from a user account at the content management system server.

18. The system of claim 17, wherein the processor is configured to execute the instructions and cause the processor to:
determine that the object is a placeholder object that does not contain complete data of the object, wherein the complete data of the object is stored in association with the user account at the content management system server; and
download the complete data of the object to the synchronized directory on the client device prior to sending the communication instructing the content management system server to delete the object from the user account at the content management system server.

19. The system of claim 13, wherein the synchronized directory includes multiple ignore files such that more than one folder within the synchronized directory includes an ignore file pertinent to a folder in which the ignore file is stored.

20. The system of claim 13, wherein the processor is configured to execute the instructions and cause the processor to:
- detect a file system event on a second object in the synchronized directory after indexing the synchronized directory;
- determine that the second object is not associated with a unique ID assigned by a content management system; and
- assign the second object a unique ID by the content management system prior to determining that the second object is prohibited from synchronizing with the content management system based on the second object matching the rule in the ignore file.

* * * * *